(No Model.)
A. L. ENGELBACH.
VEHICLE WHEEL.
No. 284,621. Patented Sept. 11, 1883.
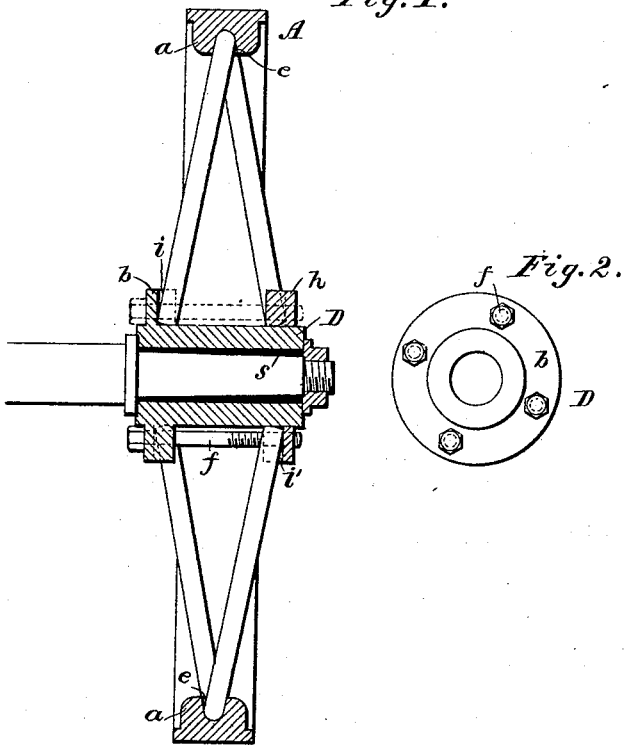
Attest:
Curt A. Cooper
H. C. Hansmann
A. L. Engelbach
Inventor:
By Foster & Freeman
his attys

UNITED STATES PATENT OFFICE.

AUGUSTUS L. ENGELBACH, OF LEADVILLE, COLORADO.

VEHICLE-WHEEL.

SPECIFICATION forming part of Letters Patent No. 284,621, dated September 11, 1883.

Application filed May 12, 1883. (No model.)

*To all whom it may concern:*

Be it known that I, AUGUSTUS L. ENGELBACH, a citizen of the United States, and resident of Leadville, in the county of Lake and State of Colorado, have invented certain new and useful Improvements in Vehicle-Wheels, of which the following is a specification.

My invention is a metallic wheel composed of a socketed iron body carrying notched rings and spokes, all bearing directly on the body, as fully described hereinafter, so as to maintain all the parts in close contact and prevent the attachment from working loose.
The invention further consists in a mode of connecting the wheels and axles.

In the drawings, Figure 1 is a transverse section of my improved wheel. Fig. 2 is an end view of the hub.
The metallic rim of the wheel consists of an annular band, A, having an internal rib, $a$, with sockets $e$, to receive the ends of the spokes B.

The hub consists of a hollow metal cylinder, D, and a movable ring, $h$, the hub having at one end an annular flange or ring, $b$, with notches $i$, into which pass the inner ends of one-half the number of the spokes, their extreme ends abutting on the outside of the body of the cylinder. Notches $i'$ in the ring $h$ receive the inner ends of the remainder of the spokes, the extreme ends abutting on the cylinder, and bolts $f$ pass through the ring $h$ and through the flange $b$, connecting both firmly together.
By tightening the bolts the inner ends of the two diverging series of spokes are brought more closely together and the spokes all forced more firmly against the rim, thereby increasing the rigidity of the wheel.

It will be seen that the body or cylinder D of the hub is in one single piece, and that the ends of all the spokes bear directly thereon, so that there is a positive immovable bearing for each spoke, whether the rings or flanges become loosened or not. There is also less liability of the rings becoming loose, as the pressure is directly on the body of the hub instead of being upon the rings, as when the latter are socketed to constitute the end bearings of the spokes.

Instead of the ring $h$ being connected with the flange $b$ by tightening-bolts, it may be forced toward said flange by a nut or nuts, $e$ $e$, upon a thread on the outer end of the hub or body D, as shown in Fig. 3.

In some instances both the flange $b$ and ring $h$ may be movable on the hub.

When the wheel is to be fixed to the axle the space between the hub and the journal $d$ may be filled in with Babbitt metal $s$, thus securing a firm connection and rendering available old axles with the journals too much worn to serve ordinary purposes.

I claim—

The combination, in a wheel, of a hub with a stationary notched flange and movable notched ring and a socketed rim and spokes extending through the notches and bearing on the hub-body, substantially as set forth.

In testimony whereof I have signed my name to this specification in the presence of two subscribing witnesses.

AUGUSTUS L. ENGELBACH.

Witnesses:
  CHAS. J. MOORE,
  WILLIAM R. HALL.